PORTABLE TEST APPARATUS FOR COLOR TELEVISION

Filed Sept. 9, 1966 3 Sheets-Sheet 1

INVENTOR.
CECIL L. MARSHALL

BY Woodard, Weikart, Emhardt & Naughton
Attorneys

PORTABLE TEST APPARATUS FOR COLOR TELEVISION

Filed Sept. 9, 1966 3 Sheets-Sheet 2

INVENTOR
CECIL L. MARSHALL

BY Woodard, Weikart, Emhardt & Naughton
Attorneys

INVENTOR
CECIL L. MARSHALL

BY Woodard, Weikart, Emhardt & Naughton
Attorneys

United States Patent Office 3,539,720

Patented Nov. 10, 1970

3,539,720
PORTABLE TEST APPARATUS FOR COLOR TELEVISION

Cecil L. Marshall, 406 Brewer Drive, Greenwood, Ind. 46142

Filed Sept. 9, 1966, Ser. No. 578,323
Int. Cl. H04n *5/645*
U.S. Cl. 178—7.8 6 Claims

ABSTRACT OF THE DISCLOSURE

A plastic housing with three legs, snugly fits a color picture tube, providing direct lateral and vertical supporting contact with the tube wall near the face, and with the convergent portion. The housing is spaced from and encloses the deflection and convergence yokes, and controls are conveniently located at the housing exterior. Quick disconnects, suspension eyebolts, legs, and a carrying handle are at the housing exterior in specific locations to minimize direct mechanical shock transmission to the tube, aid stable mounting, and facilitate carrying thereof.

This invention relates generally to color television, and more particularly to a portable test jig facilitating the testing of color television receivers either at the usual location where the receiver is used or in the repair shop of the television service technician.

When a serviceman makes a service call to a receiver location where the color television receiver is normally used, which may be a customer's home, for example, the first problem usually encountered is the determination of whether or not the faulty performance of the receiver is caused by a circuit problem or the picture tube. If the trouble is caused by the circuit, the chassis can be pulled from the cabinet and fixed on the job at the receiver location or it can be readily returned to the serviceman's shop for repair. However if the color picture tube is faulty, it is normally necessary to pull everything out of the cabinet to correct the problem.

When a picture tube is disturbed, it may take two to three hours to set it up again for proper performance. If a picture tube is changed it will usually cost a customer $150.00 or more. Therefore, it is important to determine at the outset whether or not a malfunction of a receiver is caused by the circuitry or the picture tube. Prior to the present invention, no satisfactory means have been available for diagnosing the problem at the customer's location as well as at the serviceman's work bench.

It is therefore a general object of the present invention to provide an improved means and method for testing color television receivers.

A further object is to provide color test apparatus which is readily portable and useful both at a customer's location and at the serviceman's work bench.

A still further object is to provide apparatus wherein a color picture tube is safely incorporated and disposed for easy portability and utilization wherever desired.

Described briefly, according to a typical embodiment of the present invention, a color picture tube is fitted into and directly supported by a plastic housing or case which is of a configuration well adapted to this purpose. No chassis is incorporated in the case but it is provided with suitable apertures enabling quick connection and disconnection of multi-connector plugs and cables whereby the tube is connectable to the various appropriate supplies of a color television receiver to be tested. A printed circuit board is mounted in the case and has appropriate adjustable members readily accessible from the exterior to facilitate such adjustment as may be required from time to time. The case is provided with a handle located for excellent portability. It also has legs enabling the proper use of the apparatus on a bench or on the floor, and it is also provided with hooks at the top whereby it can be conveniently hung from a cabinet, ceiling, or other overhead structure.

The full nature of the invention will be understood from the accompanying drawings and the following description and claims:

Figures 1, 2:
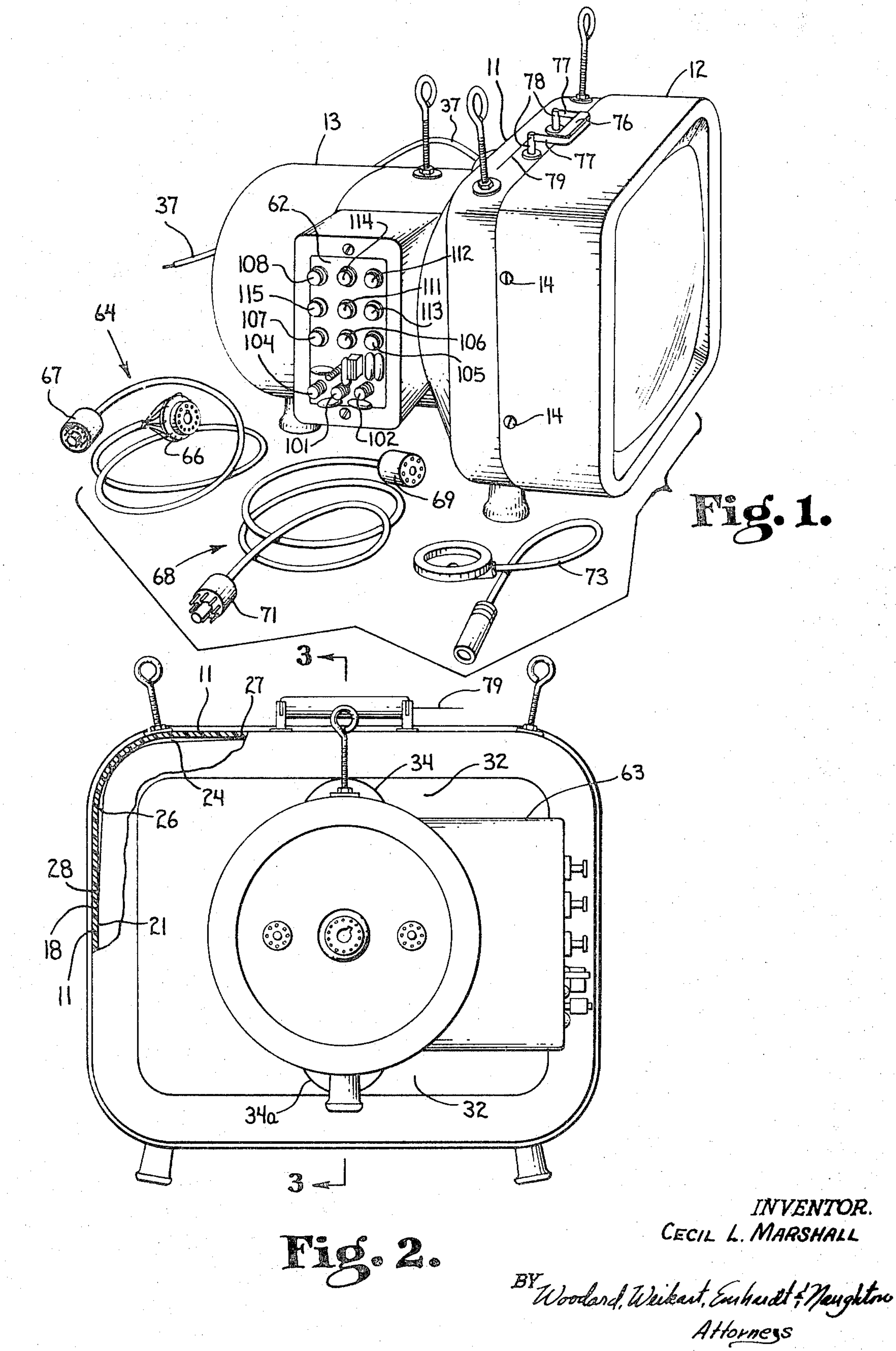
FIG. 1 is a perspective view of typical embodiment of the apparatus of the present invention.
FIG. 2 is a rear elevational view thereof on a slightly larger scale and with a portion broken away to show an interior feature.

Referring now to the drawings in detail, the apparatus includes a housing or case having a central or intermediate portion 11 with a front end cover 12 slidingly received thereon and a rear end cover 13 slidingly recived thereon. As shown in FIG. 1 but as better illustrated in FIGS. 3 and 4, the front end cover is affixed to the portion 11 by screws 14. Similarly, the rear end cover is affixed to the portion 11 by the screws 16.

Figure 3:
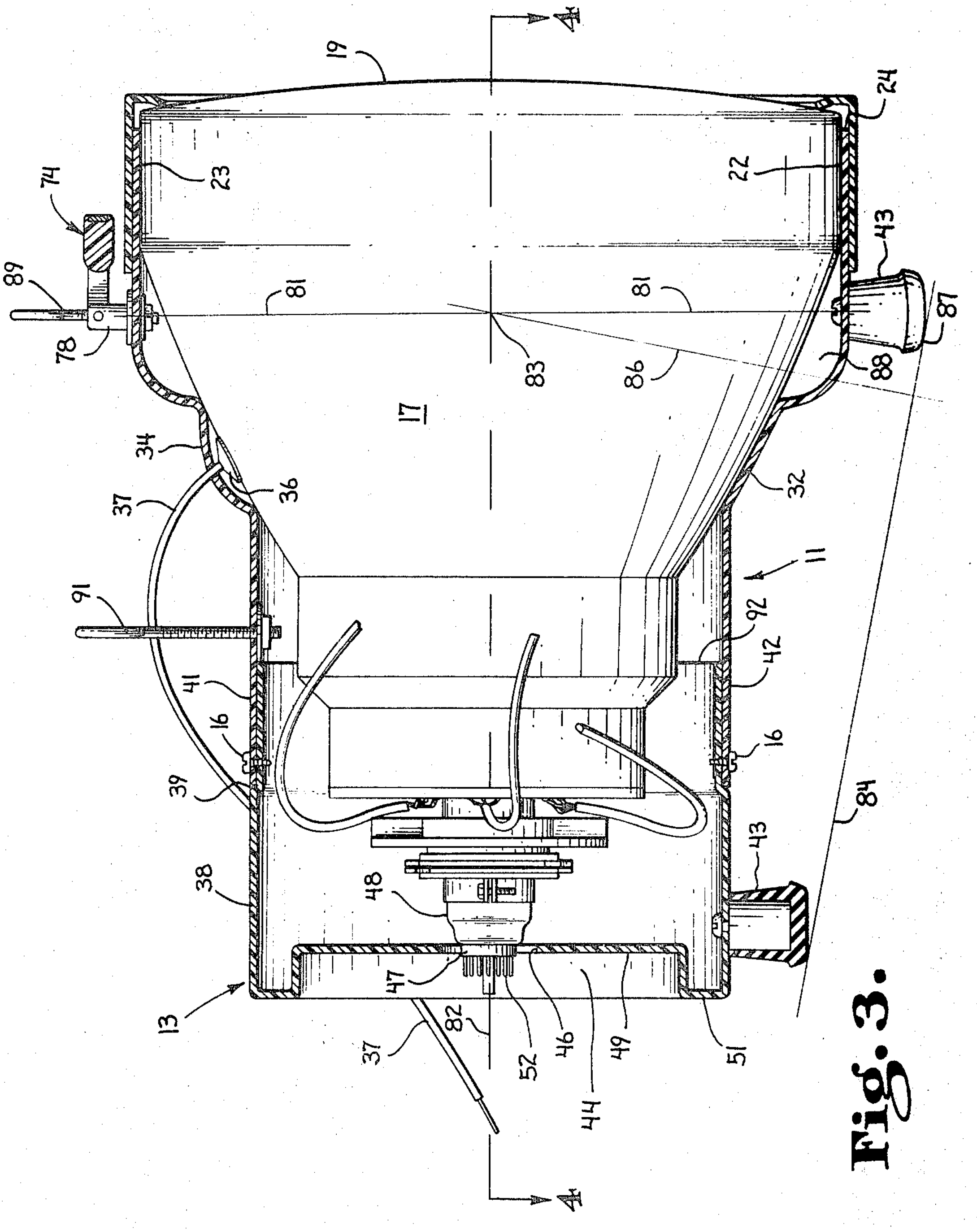
FIG. 3 is an enlarged section therethrough taken along the line 3—3 in FIG. 2 and viewed in the direction of the arrows.
Figure 4:
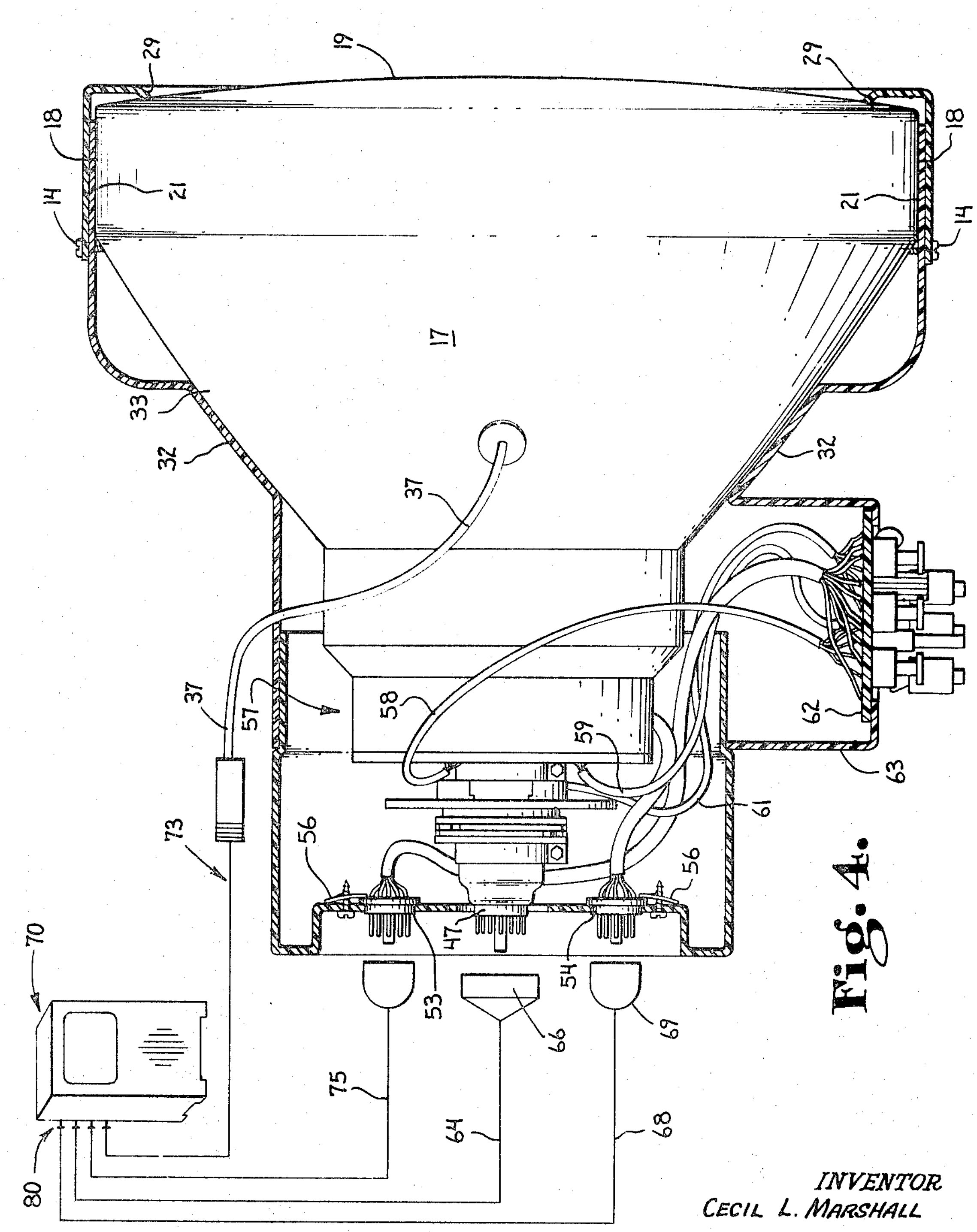
FIG. 4 is another section therethrough taken on the line 4—4 in FIG. 3 and viewed from above in the direction of the arrows, and showing a receiver to be tested, on a much reduced scale.

A color picture tube (kinescope) is fittingly received in the case so that no chassis is required. For example, as shown in FIG. 4 and in the cutaway portion of FIG. 2, the portion 18 of the kinescope extending back from the front face 19 abuttingly engages the vertical inside wall 21 of the case portion 11 to provide horizontal support for the front end of the kinescope. Similarly, as shown in FIG. 3, the vertical support for this front portion of the kinescope is provided by the lower inside wall 22 and upper inside wall 23 of the case portion 11 near the front marginal edge 24 thereof. These walls abuttingly engage the lower and upper horizontally extending portions of the kinescope glass immediately behind the front face 19 thereof. It is preferable that a snug fit be provided at the top and bottom and left and right hand sides of the kinescope at this frontal portion thereof in the case. Molded polyethylene approximately 5/32 inch thick has been found to be well suited as a case material for this purpose.

An advantage of polyethylene for this purpose is its ability to stretch to accommodate variations which might occur in production and yet enable the installation and fitting reception of a kinescope therein and secure retention of the kinescope therein. To further accommodate some variations in production, the radius of the case or housing at the four corners is made somewhat greater than is the radius of the kinescope so that some relief space is provided between the kinescope and the case at each of the four corners. This is illustrated in FIG. 2 at 24 and 26 whereas the abutting engagement as indicated in FIG. 3 begins at about a point 27 at the top at about 28 on the side. Thus the upper and lower walls as well as the side walls of the case are enabled to conform to the kinescope to the extent required to fittingly and snugly receive it. The front cover member 12 then goes over the front end portion of the kinescope and is secured in position with the inturned flange 29 thereof engaging the front face 19 of the kinescope safety glass, well inside the outer marginal edges of the safety glass but outside the picture display area of the tube. Thus the inwardly turned flange 29 of the front end cover 12 serves not only as an extra measure of safety in retaining the tube in the housing, but also serves to retain and maintain the position of the safety glass on the front end of the kinescope and frames the picture. Thus in the event that the tube is broken and implodes, the case is thick and strong enough to avoid piercing by glass or other fragments of the tube. The safety glass prevents anything from passing out through the front of the apparatus.

The longitudinal position of the kinescope is maintained from the front both by the friction fit and the flange at the front end. From the rear it is maintained by the friction fit and by a tapering or convergent portion 32 of the housing abuttingly engaging the tapering portion 33 of the kinescope. This occurs at the sides of the kinescope as shown in FIG. 4 and at the bottom and top as shown in FIG. 3. A "bubble" 34 is provided in the tapered portion of the housing to accommodate the fitting 36 for the high voltage lead 37.

The rear end cover 13 has its generally cylindrical wall 38 provided with a slight step 39 therein providing what is, in effect, an axially extending flange 41 slidingly received in the cylindrical wall portion 42 of the case portion 11. This is a close sliding fit so that when the screws 16 are secured in the position shown and the three legs 43 are secured to the portions 11 and 13, the whole assembly can be securely rested with stability on a bench or table top or on the floor.

At the same time, a rear end recess 44 is provided in the rear end member and has a central aperture 46 therein spaced from and accommodating the connector plug fitting 47 at the rear end of the kinescope neck 48. Some radial spacing between the neck of the tube and the aperture accommodates production variations and yet the space is small enough that there is no danger to the serviceman in the event that implosion of the tube occurs, as by dropping the apparatus, for example.

Furthermore, by having the recess deep enough between the surface 49 thereof and the rear end 51 of the end member, the connector pins 52 of the plug extend sufficiently beyond the surface 49 to facilitate connection of a socket thereto and yet no part of the connector plug extends beyond the plane of the surface 51. The danger of accidentally strinking the end of the plug or the kinescope is thus minimized.

In addition to providing an aperture for the tube plug, the rear end member provides a mounting surface for the plugs 53 and 54, which are affixed thereto by screws and spring clamps as at 56, for example. The leads from pins of plug 54 extending inside the case extend in to the convergence and deflection yoke assembly 57, these particular leads being associated with the deflection yoke. Three groups of wires 58, 59 and 61 extend from the blue, red, and green convergence coils respectively of the convergence yoke to various terminals on the printed circuit board 62 mounted in the pod 63 projecting outward from the left side of the housing and formed integral therewith. Leads from this "convergence board" and the various components thereon extend to the other terminal plug 53 at the rear end member. The convergence board and controls and components and their arrangement thereon are conventional components of commercially available color television receivers. So are the picture tube, convergence and deflection yokes, and plugs. Details of the particular convergence board illustrated will be set out hereinafter. An important feature of the invention is the fact that substantial space is provided around the yoke assemblies inside the housing to accommodate all the wiring and avoid any interference of the housing with the yoke assemblies. Thus it is easy to remove and install a picture tube from the housing if ever desired and there is no hazard of mechanical maladjustment of these assemblies due to carrying the apparatus around. Control and devices in addition to or other than the convergence board can be mounted in pod 63 if desired.

The extension cord set 64 of FIG. 1 is provided for connection of the proximal end quick disconnect socket 66 thereof to the quick disconnect plug 47 on the kinescope and for connection of the remote plug 67 thereof to the demodulator and matrix circuit output socket of the television receiver being tested. The cord set 68 is provided for connection of the socket 69 thereof to the plug 54 of the test apparatus and for connection of the plug 71 thereof to the deflection circuit output socket in the television receiver 70 being tested. The high voltage lead 37 is connected to the high voltage output socket of the receiver to be tested through the high voltage lead assembly 73. Another plug and socket assembly 75 like 68 but with the number three pin omitted is provided for connection of the socket thereof to the plug 53 of the test jig and for connection of the plug thereof to the convergence output circuitry of the television receiver being tested. In the drawing these sockets of the television are shown by numeral 80 schematically in FIG. 4 because they are conventional.

Another feature of the present invention is the location of the carrying handle 74 and its orientation. The handle assembly includes the bail portion having the horizontal hand grip 76 thereof connected by the arms 77 to the support post bolts 78, the handle being hinged thereby on an axis 79 lying in a vertical plane 81 near the front face 19 of the tube and containing the center of gravity of the apparatus, the plane 81 being perpendicular to the central axis 82 of the kinescope. Preferably the center of gravity is at a point 83 on the central axis at its interception with the plane 81. In this way the hand grip of the handle is near the front face of the tube enabling a person to carry the apparatus close to his side with one hand. The fact that the center of gravity directly below the handle and is near the front of the apparatus causes the apparatus to be disposed in a convenient and comfortable attitude to enable the person to walk easily while carrying it.

The front two feet at the bottom of the housing portion 11 can be placed so that their mounting screws also lie in plane 81, avoiding the necessity of notching the front end cover member 12 to accommodate them. This is done in the illustrated embodiment and an optimum attitude for the apparatus when sitting on a bench is obtained by providing the rear leg 43 with its lower margin nearer the tube central tube axis 82 than are the lower margins of the front legs. In this way the lower margins of the legs define points in a plane 84 and it will be noted that a line 86 perpendicular to this plane and through the center of gravity 83 is well behind the point of contact 87 of the front legs with the plane. Accordingly, when the apparatus is placed on the work bench or table on its legs, it is perfectly stable and faces slightly upward at an angle most convenient to the user.

It was mentioned previously that a bubble is provided at 34 for the high voltage lead connection. Similarly there is the annular cavity 88 provided around the tube ahead of a portion of the inclined support surfaces 32 thereof and behind the front support surfaces 21, 22 and 23 of the housing. This cavity accommodates the screws fastening the front legs and the bolts and nuts for the handle support bolts 78. It also accommodates the lower ends and the nuts on the eyebolts 89, two of which are disposed in the plane 81 at the top of the housing. The third eyebolt 91 is provided at the top of the intermediate portion near the front edge 92 of the rear end member. The eyelets of these bolts thus define the corners of an isoceles triangle and enable and facilitate hanging the apparatus from a cabinet, wall, ceiling, or other overhead structure by means of cables or cords.

Another feature of the invention is the fact that its construction enables the same manufacturing equipment to be used regardless of whether the convergence controls are to be located on the left-hand side of the apparatus (as viewed from the front end as shown in the drawings) or on the right-hand side. By simply rotating the intermediate portion 180 degrees on the central axis, and reversing the leg, eyebolt and handle locations, this can be done. The bubble 34a then accommodates the high voltage connector, but it is not shown in FIG. 3 so that the taper of the portion beside it can be better shown.

In the practice of the method of the invention, the television serviceman visits the customer's location and turns on the customer's television receiver. He observes the malfunction. He then removes the rear cover of the receiver and grounds the high voltage circuit for safety purposes.

He then disconnects the picture tube connector socket from the customer's picture tube and connects it to plug 67 of the extension cord set 64 of the present invention, the socket 66 of the latter being connected to the plug of the picture tube of the present invention. He then disconnects the deflection output supply socket of the customers' set from the yoke plug thereof, and connects it to the yoke plug 71 of the wire set 68 of the present invention, the socket 69 thereof being connected to the deflection yoke connector plug 54 of the present invention.

He then disconnects the convergence board supply socket from the convergence board of the customer's set and connects it to the extension cord 75 of the present invention, the socket of which is connected to the plug 53 of the present invention. He then connects the high voltage cable 75 of the present invention to the costomer's high voltage supply, having previously disconnected the supply from the customer's picture tube. He then turns on the customer's set and makes whatever corrections or adjustments on the present invention as are indicated by the picture presented. If no malfunction is now apparent, the conclusion is reached that the customer's picture tube or the yoke or convergence assemblies associated therewith, or both, are defective. He can then proceed accordingly. On the other hand, if he is unable to obtain a satisfactory picture with the test apparatus of the present invention, his conclusion is that some circuitry of the customer's set is malfunctioning and he can proceed accordingly without disturbing the customer's picture tube or deflection or convergence yoke assemblies at all.

Thus it should be apparent that the present invention is an excellent tool for the color television serviceman, providing benefits both for him and his customer. It is a convenient tool for use in his shop as well as at his customer's premises, because it can be readily mounted to the bench or floor in the shop or suspended by suitable cables. Finally the present invention is very useful as a monitor and could be placed in any location desired in a home, factory, warehouse or elsewhere.

The case is very strong and is typically made of polyethylene molded at high pressure, with the front end member, the intermediate portion 11 including the pod 63, and the rear end member all formed of the same material. Various colors can be used according to individual tastes. The case, being very strong, provides complete protection of the surroundings from the effects of implosion of the picture tube if that ever takes place. Yet the soft rubber legs provided, and the mounting of them and of the eyebolts to the portion of the case adjacent the annular cavity 88, minmize shock transmission to the tube when the apparatus is placed upon a floor or bench, or suspended from an overhead structure.

In the illustrated embodiment of the invention, the convergence circuit board 62 as shown in FIG. 1 has the following controls thereon, the potentiometer controls having knurled knobs with slots thereon for easy manual adjustment or adjustment by use of a screwdriver, and the variable inductors having threaded adjustable cores with hexagonal sockets therein for receipt of an allen wrench:

Vertical controls—Potentiometers:
- 112 red/green horizontal lines—bottom
- 113 red/green horizontal lines—top
- 114 red/green vertical lines—bottom
- 111 red/green vertical lines—top
- 108 blue horizontal lines—bottom
- 115 blue horizontal lines—top Horizontal controls—Potentiometers:
- 105 red/green horizontal lines—left
- 106 red/green vertical lines—left
- 107 blue horizontal lines—left Horizontal controls—Tunable coils:
- 102 red/green horizontal lines—right
- 101 red/green vertical lines—right
- 104 blue horizontal lines—right While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. Portable apparatus for monitoring color television and comprising:
- a color television picture tube having a front face of substantial area for presentation of a picture to an observer,
- an exterior housing fittingly received on said tube and providing horizontal and vertical support for said tube, said housing having an opening therein sized for exposing enough of said front face for presentation of the picture to an observer while portions of said housing adjacent said opening overlap a sufficient area of said face to prevent departure of said tube from said housing through said opening;
- said tube having a convergent intermediate portion and said tube having a neck portion extending rearwardly from said intermediate portion and said tube having a multi-conductor quick-disconnect member at the rear end of said neck;
- a yoke assembly mounted on said tube around one of said portions;
- said housing having lower and upper inner wall portions snugly engaging lower and upper exterior walls respectively of said tube near said front face and providing direct vertical support for said tube near the front of said tube, and said housing having left-hand and right-hand inner upstanding wall portions snugly engaging left-hand and right-hand upstanding exterior walls respectively of said tube near said front face and providing direct horizontal support for said tube near the front of said tube;
- and said housing having convergent upper and lower and left and right walls engaging upper and lower and left and right exterior wall surfaces of said convergent portion of said tube ahead of said yoke assembly for support of said tube;
- whereby said tube is fixed in said housing, said yoke assembly and tube neck portion being spaced from said housing and enclosed thereby;
- portions of said housing intermediate the inner wall portions and said convergent walls being spaced from said tube to provide a cavity; and
- leg means affixed to said housing at said intermediate portions for support of said housing on a table or the like.

2. The apparatus of claim 1 and further comprising externally adjustable picture controls mounted in said housing adjacent said yoke assembly and coupled to said yoke assembly and having tool receiving portions thereof exposed at a second opening at the side of said housing and readily accessible by a technician while viewing a picture on said tube through the opening in the front of said housing.

3. The apparatus of claim 2 and further comprising:
- a rear end member on said housing and having a recess with an aperture therein, said recess receiving a connector plug member received on said quick-disconnect member, said housing end member being amply spaced from said tube neck portion and disconnect member and plug member at said aperture to avoid contact therewith, said end member having a second quick disconnect member affixed thereto and including conductors connected to said yoke assembly;

and said end member having a third quick disconnect member affixed thereto and including conductors connected to said controls.

4. Portable apparatus for monitoring color television and comprising:

a color television picture tube having a front face of substantial area for presentation of a picture to an observer, an exterior housing fittingly received on said tube and providing horizontal and vertical support for said tube, said housing having an opening therein sized for exposing enough of said front face for presentation of the picture to an observer while portions of said housing adjacent said opening overlap a sufficient area of said face to prevent departure of said tube from said housing through said opening;

said tube having a convergent intermediate portion and said tube having a neck portion extending rearwardly from said intermediate portion and said tube having a multi-conductor quick-disconnect member at the rear end of said neck;

a yoke assembly mounted on said tube around one of said portions;

said housing having lower and upper inner wall portions snugly engaging lower and upper exterior walls respectively of said tube near said front face and providing direct vertical support for said tube near the front of said tube, and said housing having left-hand and right-hand inner upstanding wall portions snugly engaging left-hand and right-hand upstanding exterior walls respectively of said tube near said front face and providing direct horizontal support for said tube near the front of said tube;

and said housing having convergent upper and lower and left and right walls engaging upper and lower and left and right exterior wall surfaces of said convergent portion of said tube ahead of said yoke assembly for support of said tube;

whereby said tube is fixed in said housing, said yoke assembly and tube neck portion being spaced from said housing and enclosed thereby;

externally adjustable controls mounted in said housing adjacent said yoke assembly and having tool receiving portions thereof exposed at a second opening at the side of said housing and readily accessible by a technician while viewing a picture on said tube through the opening in the front of said housing;

said yoke assembly including convergence means and said controls being coupled to said convergence means.

5. Portable apparatus for monitoring color television and comprising:

a color television picture tube having a front face of substantial area for presentation of a picture to an observer, an exterior housing fittingly received on said tube and providing horizontal and vertical support for said tube, said housing having an opening therein sized for exposing enough of said front face for presentation of the picture to an observer while portions of said housing adjacent said opening overlap a sufficient area of said face to prevent departure of said tube from said housing through said opening;

a plurality of eyebolts affixed to the top of said housing at spaced points and projecting upwardly therefrom providing three eyelets at the corners of a substantially horizontal isoceles triangle to facilitate suspension of said apparatus by tensile members attached to overhead structure; and legs affixed to said housing near the front end thereof, said housing having a portion with a laterally extending pod thereon, said pod having control members therein, two of said bolts being interchangeable with said pair of legs to accommodate a rotation of said housing portion on the tube axis for movement of said pod and control members from the left-hand side to the right-hand side of said apparatus as viewed from the front and vice-versa as desired.

6. Portable apparatus for monitoring color television and comprising:

a color television picture tube having a front face of substantial area for presentation of a picture to an observer, and a deflection and convergence yoke assembly, an exterior housing comprising a front end cover, a central portion, and a rear end cover, said central portion being of single homogeneous molded plastic material slidingly and fittingly received on said tube in direct contact therewith and providing horizontal and vertical support for said tube, said housing having an opening therein sized for exposing enough of said front face for presentation of the picture to an observer while portions of said housing adjacent said opening overlap a sufficient area of said face to prevent departure of said tube from said housing through said opening, and said housing covering said yoke assembly;

said front end cover being slidingly telescopically received on the front end of said central portion and removably affixed thereto, said cover having an inwardly turned flange framing and engaging a portion of the front face of said picture tube, said flange defining said opening;

and a rear end cover slidingly telescopically received on the rear end of said central portion and removably affixed thereto;

said apparatus having extension cord sets with proximal ends connected thereto by quick disconnect plug and socket assemblies and remote ends with plugs thereon adapted to direct connection to electron gun, deflection circuit, and convergence circuit supply sockets of conventional color television receivers to be tested.

References Cited

UNITED STATES PATENTS

| | | | |
|---|---|---|---|
| 2,047,020 | 7/1936 | Flaherty | 178—7.8 |
| 2,435,613 | 2/1948 | Sproul | 178—7.82 |
| 2,648,724 | 8/1953 | Enslein | 178—6 |
| 2,797,408 | 6/1957 | Greatbatch | 178—7.82 |
| 3,013,117 | 12/1961 | Nichol | 178—7.82 |
| 3,015,692 | 1/1962 | Herrington | 178—7.8 |
| 3,105,110 | 9/1963 | Kitamura | 178—7.9 |
| 3,369,201 | 2/1968 | Fiore | 178—7.8 |
| D. 195,696 | 7/1963 | Lee | D56—4 |
| 2,497,078 | 2/1950 | Gall | 178—7.8 |
| 3,404,227 | 10/1968 | Alcala | 178—7.8 |

OTHER REFERENCES

Electric Manufacturing, vol. 57, No. 3, p. 179, March 1956, 178–7.82.

RICHARD MURRAY, Primary Examiner

J. A. ORSINO, Jr., Assistant Examiner

U.S. Cl. X.R.

178—7.82, 7.9; 324—20